United States Patent
Becquet

(10) Patent No.: US 12,434,821 B2
(45) Date of Patent: Oct. 7, 2025

(54) PIVOTING LANDING GEAR PROVIDED WITH AN IMMOBILIZATION SYSTEM

(71) Applicant: AIRBUS HELICOPTERS, Marignane (FR)

(72) Inventor: Roland Becquet, Meyreuil (FR)

(73) Assignee: AIRBUS HELICOPTERS, Marignane (FR)

( * ) Notice: Subject to any disclaimer, the term of this patent is extended or adjusted under 35 U.S.C. 154(b) by 16 days.

(21) Appl. No.: 18/635,450

(22) Filed: Apr. 15, 2024

(65) Prior Publication Data

US 2025/0019068 A1  Jan. 16, 2025

(30) Foreign Application Priority Data

Jul. 10, 2023  (FR) ...................................... 2307363

(51) Int. Cl.
  *B64C 25/34* (2006.01)
  *B64C 25/32* (2006.01)

(52) U.S. Cl.
  CPC ........ *B64C 25/34* (2013.01); *B64C 2025/325* (2013.01)

(58) Field of Classification Search
  CPC ........................... B64C 25/34; B64C 2025/325
  See application file for complete search history.

(56) References Cited

U.S. PATENT DOCUMENTS

| | | | | |
|---|---|---|---|---|
| 2,384,054 A | * | 9/1945 | Trautman | B64C 25/14 244/102 R |
| 2,502,522 A | * | 4/1950 | Hoobler | B64C 25/50 244/50 |
| 3,375,999 A | * | 4/1968 | Labrecque | B64C 25/50 244/50 |
| 5,333,816 A | * | 8/1994 | Del Monte | B64C 25/50 244/50 |
| 2012/0091264 A1 | * | 4/2012 | Lafitte | F16D 7/10 244/50 |

FOREIGN PATENT DOCUMENTS

| | | |
|---|---|---|
| CN | 104210654 A | 12/2014 |
| EP | 0662906 B1 | 3/1997 |
| GB | 970425 A | 9/1964 |
| WO | 2010115893 A1 | 10/2010 |

OTHER PUBLICATIONS

French Search Report for French Application No. FR2307363, Completed by the French Patent Office, Dated Jan. 17, 2024, 9 pages.

* cited by examiner

*Primary Examiner* — Tye William Abell
(74) *Attorney, Agent, or Firm* — BROOKS KUSHMAN P.C.

(57) ABSTRACT

A landing gear provided with a stand and a pivoting assembly carrying a contact member and able to rotate about a pivot axis in relation to the stand. An immobilization system comprises a movable pin and a passage provided in a base secured to the pivoting assembly. An elastic locking system tends to push the pin into the passage in a locked mode. An elastic unlocking system is configured to move the pin out of the passage when activation of an unlocked mode is commanded by a control, the elastic unlocking system being calibrated to allow the pin to be extracted from the passage only when there is a shearing force less than a threshold between the base and the pin.

20 Claims, 7 Drawing Sheets

PIVOTING LANDING GEAR PROVIDED WITH AN IMMOBILIZATION SYSTEM

CROSS REFERENCE TO RELATED APPLICATION

This application claims the benefit of FR 23 07363 filed on Jul. 10, 2023, the disclosure of which is incorporated in its entirety by reference herein.

TECHNICAL FIELD

The present disclosure relates to a pivoting landing gear provided with an immobilization system.

BACKGROUND

A landing gear of an aircraft, for example a rotorcraft or a helicopter, may comprise at least one pivoting landing gear. Such a pivoting landing gear may comprise an assembly carrying at least one ground contact member and able to pivot through 360 degrees about a pivot axis in order to facilitate the movement of the aircraft on the ground. The term "ground" refers hereinafter to any surface on which an aircraft can land, such as the surface of the Earth, the roof of a building, the deck of a ship, etc.

For example, a tricycle-gear rotorcraft may comprise two main landing gears and one auxiliary landing gear each comprising at least one wheel. The two main landing gears are not able to pivot. However, the auxiliary landing gear is able to pivot in order to ensure the maneuverability of the aircraft on the ground. When on the ground, the wheel or wheels of the auxiliary landing gear are free to pivot about a pivot axis that is separate from the axis or axes of rotation of the wheels. On a helicopter provided with a yaw angle control system, for example of the type comprising a rear rotor, turning can be undertaken on the ground by controlling the thrust exerted by this yaw angle control system. The yaw angle control system generates a moment on an airframe of the aircraft carried by the landing gears, and this moment automatically pivots the auxiliary landing gear to orientate the aircraft in the required direction.

However, such a pivoting landing gear is conventionally provided with an immobilization system. On command, the immobilization system locks the pivoting landing gear in a position that causes the aircraft to move in a straight line. Indeed, it is necessary to pivotally lock the auxiliary landing gear during a running landing with engine failure, or when landing the aircraft on a slope or on the deck of a ship or equivalent.

A known immobilization system comprises a pin capable of entering a bore of a base secured to the pivoting assembly of a pivoting landing gear. The immobilization system also comprises an elastic connecting rod linked to the pin and to a control. The control may comprise a handle linked to the elastic connecting rod by a non-elastic link.

In order to place the immobilization system in an unlocked mode, the control is maneuvered by an operator to position the elastic connecting rod in a first position. The locking pin is then outside the bore. As a result, the pivoting assembly is free to pivot about a pivot axis.

In order to lock the pivoting landing gear, the control is maneuvered by an operator to position the elastic connecting rod in a second position, bringing it closer to the bore.

If the pin is in line with the bore, this pin enters the bore. The immobilization system is then in a locked phase of a locked mode. The pivoting assembly is then no longer free to pivot through 360 degrees about the pivot axis.

If the pin is not in line with the bore, the pin comes to abut against the base. The elastic connecting rod is compressed and tends to push the pin towards the base. The immobilization system is then in an armed phase of the locked mode. The pivoting assembly is temporarily free to pivot about the pivot axis. As soon as the pin reaches the bore, the elastic connecting rod expands and pushes the pin into this bore. Therefore, the immobilization system switches automatically into the locked phase of the locked mode.

Another known immobilization system comprises a pin that is able to move not in translation but in rotation.

Such locking systems are useful. However, when the pivoting assembly is in the locked phase and tends to pivot, the base exerts a shearing force on the locking pin. Depending on the intensity of this force and the friction coefficient between the pin and the base, unlocking may not be possible. In particular, when the yaw angle control system generates significant transverse thrust, the shearing force can be significant. However, if a pilot forces and manages to move the control to place the immobilization system in the unlocked mode, the aircraft may suddenly be destabilized.

Document U.S. Pat. No. 3,375,999 A describes a releasable locking mechanism for a pivoting wheel. This mechanism comprises a projection that can be accommodated in a notch between two locking arms. The wheel is locked at rest and unlocked when the force exceeds a threshold. Therefore, this system is not designed to deal with the present problem.

Document WO2010115893 A1 discloses a system comprising a friction member for exerting a frictional force between two components. The system comprises control means for varying the pre-load exerted by the pressing member on the friction member.

Document EP 662906 B1 describes a means for rotationally locking a landing gear provided with a locking pin assembly.

Document CN104210654 A describes a wheel lock indicator comprising a pin that is able to move in translation in relation to a housing and is automatically held in position by means of a return spring.

Document U.S. Pat. No. 2,502,522 A describes a landing gear provided with a stand and a pivoting assembly carrying a contact member. The landing gear has an immobilization system that comprises a pin and a passage provided in the stand. Moreover, an elastic system comprises two springs. A first spring is arranged between an upper plate secured to the pivoting assembly and a collar secured to the pin, whereas a second spring is arranged between a lower plate secured to the pivoting assembly and the collar.

Document U.S. Pat. No. 2,384,054 A describes a retractable landing gear provided with a system comprising a cable passing around a pulley to join a centering pin.

Document GB 970425 A describes a landing gear provided with a latch that can be engaged in openings of a fork carrying a wheel.

SUMMARY

An object of the present disclosure is thus to propose a landing gear provided with an innovative immobilization system for limiting the risks of sudden destabilization.

The disclosure thus relates to a landing gear provided with a stand and a pivoting assembly carrying a contact member that is configured to be in contact with the ground, said pivoting assembly being able to rotate about a pivot axis in relation to the stand, said landing gear having an immobilization system comprising a movable pin and a control configured to request the application of a locked mode or an unlocked mode, the immobilization system comprising a passage provided in a base secured to the pivoting assembly, the pin being outside said passage in an unlocked phase of the unlocked mode, the pin being able to move in said passage in azimuth relative to the pivot axis in a locked phase of the locked mode, the immobilization system having an elastic locking system tending to push/pushing the pin into the passage in the locked mode, the pin being pushed in the locked mode, by the elastic locking system, either against the base during an armed phase of the locked mode as long as the pin does not enter the passage, or into the passage as soon as the pin is in line with the passage in the locked phase.

The immobilization system comprises an elastic unlocking system configured to move said pin out of the passage when activation of the unlocked mode is commanded by the control, the elastic unlocking system being calibrated to allow the pin to be extracted from the passage only when there is a shearing force less than a threshold between the base and the pin.

The immobilization system is thus configured to immobilize said pivoting assembly within a predetermined range of positions in relation to the stand during a locked phase of a locked mode and to authorize unlimited pivoting of the pivoting assembly in relation to the stand during an unlocked phase of an unlocked mode.

The expression "immobilization system configured to immobilize said pivoting assembly within a predetermined range of positions in relation to the stand during a locked phase of a locked mode" means that the pivoting assembly can pivot only within the space in azimuth, in relation to the pivot axis, between the stand and the pin when the pin is in the passage. Indeed, the passage has, with reference to the pivot axis, a dimension along an arc of a circle that is greater than a dimension of the pin. Therefore, the pin can easily enter the passage, but the base has limited freedom of movement in azimuth. Depending on the position of the pin in the passage, the base exerts or does not exert a shearing force on the pin.

The expression "the pin being able to move in said passage in azimuth relative to the pivot axis" means that there is always a gap separating the pin from the base along an of a circle centered on the pivot axis. This gap gives the base freedom of movement in relation to the pin, when the pin is in the passage, limited to the predetermined range of positions, for example of the order of 0.5 degrees. On an aircraft, this angle may depend on the longitudinal distance between fixed landing gears of the aircraft and the landing gear that has the pivoting assembly of the disclosure.

In addition to the armed, locked and unlocked phases of the prior art, the elastic unlocking system makes it possible to create a disarmed phase when switching from the locked mode to the unlocked mode.

If the base exerts a shearing force less than the threshold on the pin, the pin moves directly out of passage, the immobilization system switching directly to the unlocked phase. The pivoting assembly is free to pivot about the pivot axis, at least over 180 degrees, for example, or indeed over 360 degrees.

If the base exerts a shearing force greater than or equal to the threshold on the pin, for example if there is a rear rotor generating a significant yaw moment on an airframe of the aircraft, the switch from the locked mode to the unlocked mode causes the elastic unlocking system to compress. The immobilization system switches to a disarmed phase of the unlocked mode. This elastic unlocking system is calibrated such that it is not able to expand in these conditions. In other words, the stiffness along the compression/expansion axis of the elastic unlocking system is chosen to ensure a switch to the unlocked phase in the desired conditions. As soon as the shearing force drops below the threshold, following a slight pivoting of the pivoting assembly, the elastic unlocking system expands and automatically expels the pin from the passage to reach the unlocked phase.

Therefore, the elastic unlocking system prevents unlocking when there is a significant shearing force, that is synonymous on a helicopter of a significant moment exerted on the airframe. This elastic unlocking system helps prevent sudden movement when activation of the unlocked mode is commanded by a pilot. This means that the landing gear can only be unlocked in specific operational situations. If there is a high shearing force, unlocking is prohibited, even if it is commanded by the pilot. The pilot can therefore command unlocking regardless of the shear stress on the pin. Unlocking will only take effect when the force applied to this pin drops below a predetermined force threshold. The pivoting landing gear according to the disclosure therefore helps optimize safety.

The landing gear according to the disclosure may have one or more of the following features, taken individually or in combination.

According to a first alternative, the pin may be able to move in translation in relation to the base along a translation axis, for example parallel to the pivot axis.

The first alternative is therefore applicable to a system comprising a pin that is able to move in translation.

For example, the immobilization system may comprise a hollow support that extends towards the base along the translation axis from an end wall to an open end, the open end being arranged between the end wall and the base, the pin comprising a head secured to a locking rod, the head being located in the hollow support and the locking rod emerging through the open end of the hollow support at least in the locked phase, the elastic locking system being arranged between the end wall and the head.

The support guides the translational movement of the head, and consequently of the pin. The stand may also guide the translational movement of the pin.

The elastic locking system can thus be compressed when switching from the unlocked mode to the locked mode when the pin is not in line with the passage. The immobilization system is then in an armed phase, the elastic locking system being ready to expand to push the pin into the passage.

The elastic locking system may possibly comprise a locking spring with a coil fastened to the end wall.

According to a first variant of the first alternative, the support may be able to move in translation in relation to the stand, said control being connected to the support.

During the switch from the unlocked mode to the locked mode, the support switches from a first position to a second position. If the pin is not in line with the passage, the support compresses the elastic locking system during a possible armed phase. The pin is then pressed against the support. As soon as the pin is positioned in line with the passage, the elastic locking system expands to switch automatically to the locked phase as soon as possible.

During the switch from the locked mode to the unlocked mode, the support switches from the second position to the first position. If the base exerts a shearing force greater than or equal to the threshold on the pin, the pin remains in place and the support compresses the elastic unlocking system during a possible disarmed phase. As soon as the shearing force on the pin drops below the threshold, the elastic unlocking system expands to switch automatically to the unlocked phase.

The first variant of the first alternative can therefore be relatively simple and easy to implement.

The elastic unlocking system may possibly be arranged between the head and an inner shoulder of the support, the locking rod passing through the inner shoulder, the inner shoulder being situated between the head and the base.

The elastic unlocking system may possibly comprise an unlocking spring with a coil fastened to the inner shoulder.

According to a second variant of the first alternative, the support may be stationary in relation to the stand, the pin comprising an entry rod secured to the head and passing through the end wall of the support.

For example, the entry rod extends from the head to a top secured to a hollow tube, said control comprising a cable that extends up to a plate that is able to move in translation in the hollow tube, passing through a wall of the tube, the elastic unlocking system being arranged between said wall and said plate.

Furthermore, the stiffness of the elastic unlocking system along the translation axis may be greater than the stiffness of the elastic locking system along the translation axis. Therefore, the elastic unlocking system expands when the pin is released by the base.

The second variant of the first alternative may also be relatively simple and easy to implement.

Furthermore, the stiffness of the elastic unlocking system along the translation axis may be greater than the stiffness of the elastic locking system along the translation axis, in particular but not only according to the second variant of the first alternative. Therefore, the elastic unlocking system expands when the pin is released by the base.

According to a second alternative, the pin has not a degree of translation freedom but a degree of rotational freedom in relation to the stand.

For example, the pin may be carried by a lever pivotally connected to the stand, the elastic locking system being arranged between the stand and the lever, the control comprising a cable connected to a panel that is able to move in translation in a guide, the guide being connected to the lever, the elastic unlocking system being arranged between the panel and a partition of the guide through which the cable passes.

Regardless of the alternative, the contact member may comprise a wheel that is able to rotate about a wheel axis in relation to the pivoting assembly, said wheel axis being distinct from the pivot axis. The wheel axis and the pivot axis are also not parallel.

According to another object, a rotorcraft may comprise at least one pivoting landing gear according to the disclosure.

The disclosure also relates to the method that is implemented, i.e., a method for locking and unlocking a landing gear provided with a stand and a pivoting assembly carrying a contact member that is configured to be in contact with the ground, said pivoting assembly being able to rotate about a pivot axis in relation to the stand, said landing gear having an immobilization system configured to immobilize said pivoting assembly within a predetermined range of positions in relation to the stand during a locked phase of a locked mode and to authorize unlimited pivoting of the pivoting assembly in relation to the stand during an unlocked phase of an unlocked mode, the immobilization system comprising a movable pin and a control configured to request the application of the locked mode or the unlocked mode, the immobilization system comprising a passage provided in a stand secured to said pivoting assembly, the pin being outside said passage in the unlocked phase, the pin being able to move in said passage in azimuth relative to the pivot axis in the locked phase.

This method comprises:
 when the immobilization system is in the unlocked mode, activating said control in order to switch to the locked mode, then: (i) if the pin is in line with the passage, moving the pin into the passage; and (ii) if the pin is not in line with the passage, pressing the pin against the base with an elastic locking system and moving the pin into the passage as soon as the pin comes into line with the passage; and
 when the immobilization system is in the locked mode, activating said control in order to switch to the unlocked mode, then, if the pin is in the passage and in contact with the base, compressing an elastic unlocking system, and: (i) keeping the pin in the passage as long as the pin is subject to a shearing force greater than or equal to a threshold, the immobilization system being in a disarmed phase; and (ii) as soon as the pin is subject to a shearing force less than the threshold, expansion of the elastic unlocking system and ejecting the pin out of the passage under the effect of said expansion in order to switch to an unlocked phase.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
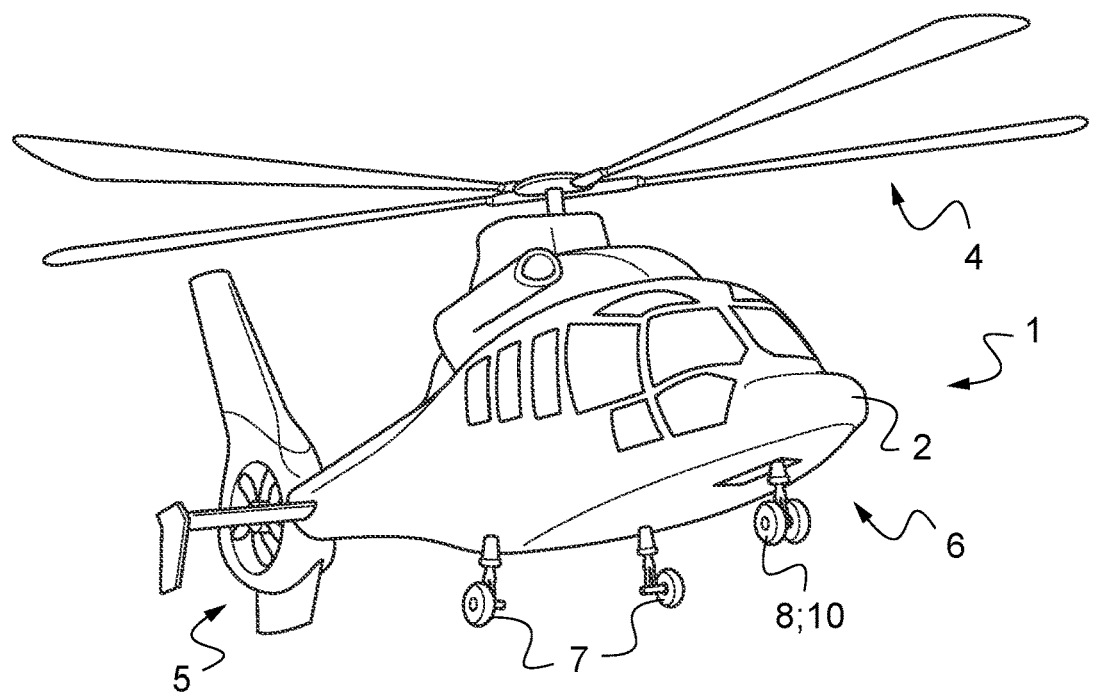
FIG. 1 is a diagram showing a rotorcraft according to the disclosure.

FIG. 1 shows a rotorcraft 1 according to the disclosure. This rotorcraft 1 comprises an airframe 2 possibly carrying at least one rotor and a yaw control system. In this case, the rotorcraft 1 shown comprises a main rotor 4 and a rear rotor 5 acting as a yaw control system.

Furthermore, the airframe 2 rests on a landing system 6 comprising, for example, at least one landing gear, i.e., two main landing gears 7 and an auxiliary landing gear 8 in this example.

This rotorcraft 1 comprises, in particular, at least one pivoting landing gear 10, i.e., the auxiliary landing gear 8 in this example.

Figure 2:
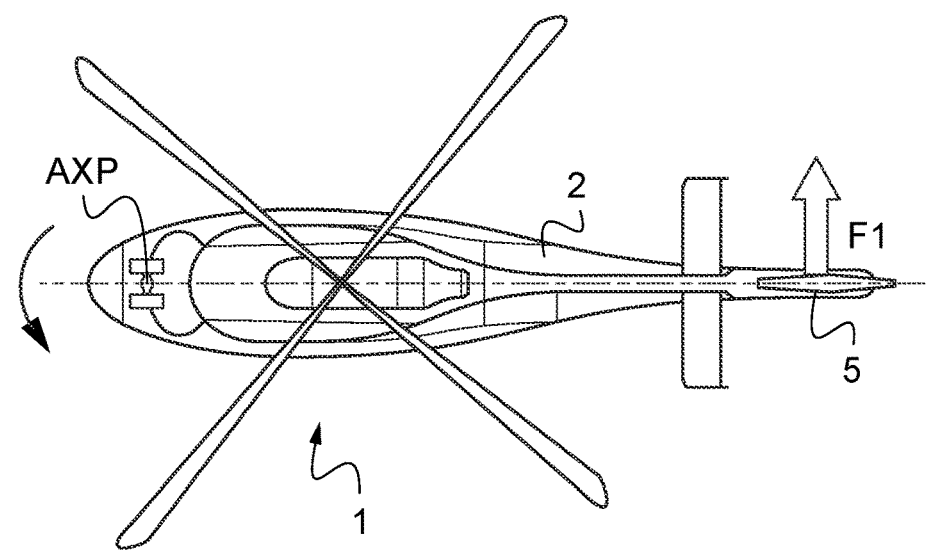
FIG. 2 is a diagram showing a top view of the rotorcraft of FIG. 1.

In reference to FIG. 2, when the yaw control system exerts lateral thrust F1, the pivoting landing gear 10 rotates on the ground about a pivot axis AXP in order to modify the orientation of the rotorcraft 1.

The landing gear 10 therefore comprises an immobilization system to keep the pivoting landing gear 10 substantially aligned along the axis of forward movement of the rotorcraft 1, under certain conditions.

Figure 3:
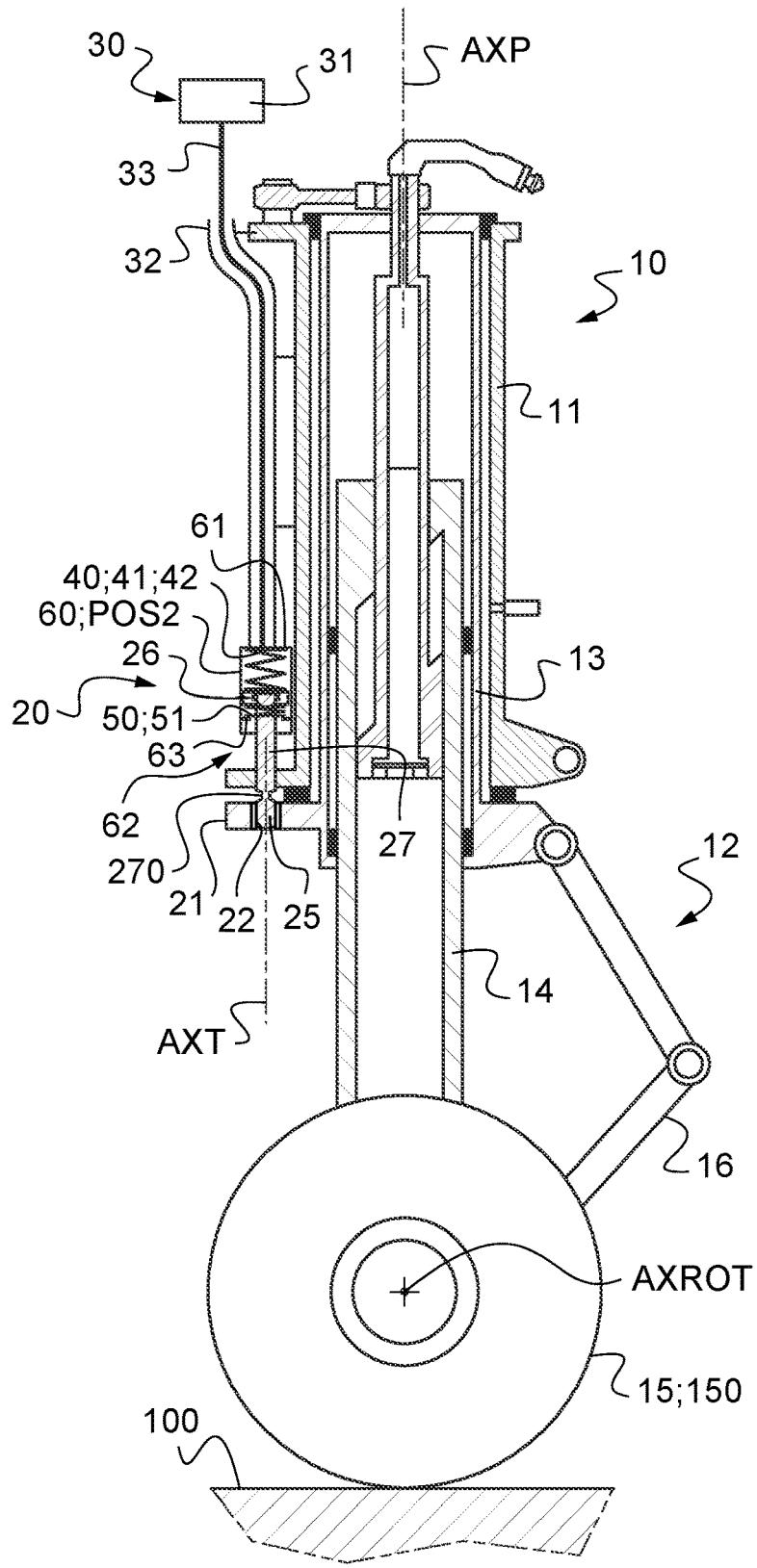
FIG. 3 is a diagram showing a pivoting landing gear according to the disclosure having an immobilization system in a locked phase of the locked mode.

FIG. 3 shows an embodiment of a pivoting landing gear 10 according to the disclosure. Irrespective of the embodiment, the landing gear 10 is provided with a stand 11, connected to the airframe 2, and a pivoting assembly 12 that can pivot about a pivot axis AXP in relation to the stand 11. The pivoting assembly 12 carries at least one contact member 15 that is configured to be in contact with the ground 100. For example, a contact member 15 comprises a skid and/or a wheel 150 that is able to rotate about a wheel axis AXROT in relation to the pivoting assembly 12.

By way of illustration, FIG. 3 shows an example of a stand 11 and a pivoting assembly 12, but other embodiments of the pivoting assembly 12 may be envisaged. In particular, the stand 11 may be fixed or retractable without going beyond the ambit of the disclosure. According to the example shown, the pivoting assembly 12 may comprise a cylinder 13 that is able to rotate about the pivot axis in relation to the stand 11. Moreover, the pivoting assembly 12 comprises a damper 14 carried by the cylinder 13 and housed at least partially in this cylinder 13, this damper 14 possibly being provided with a device referred to as an anti-shimmy device. Furthermore, scissors 16 are hinged to the cylinder 13 and to the damper 14. At least one contact member 15 may be carried by the scissors 16 or the damper 14, for example.

Irrespective of the embodiment of the pivoting assembly 12 and the stand 11, the landing gear 10 comprises an immobilization system 20 configured to: (i) immobilize the pivoting assembly 12 within a predetermined restricted range of positions in relation to the stand 11 during a locked phase of a locked mode; and to (ii) authorize unlimited pivoting of the pivoting assembly 12 in relation to the stand 11 during an unlocked phase of an unlocked mode.

Figure 4:
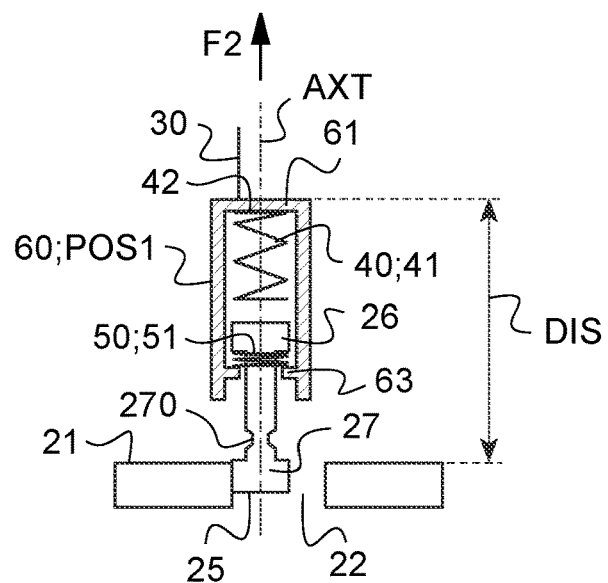
FIG. 4 is a diagram showing the immobilization system of the pivoting landing gear of FIG. 3 in a disarmed phase of the unlocked mode.
Figure 5:
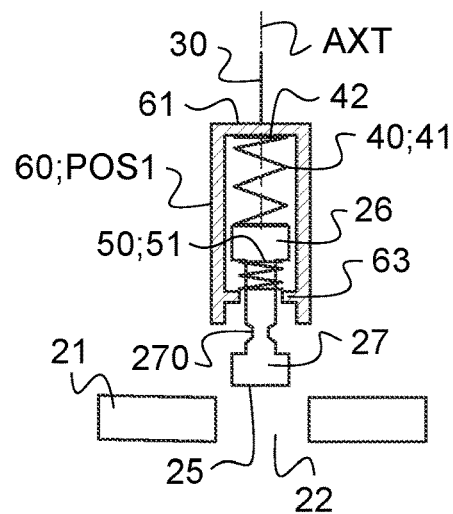
FIG. 5 is a diagram showing the immobilization system of the pivoting landing gear of FIG. 3 in an unlocked phase of the unlocked mode.
Figure 6:
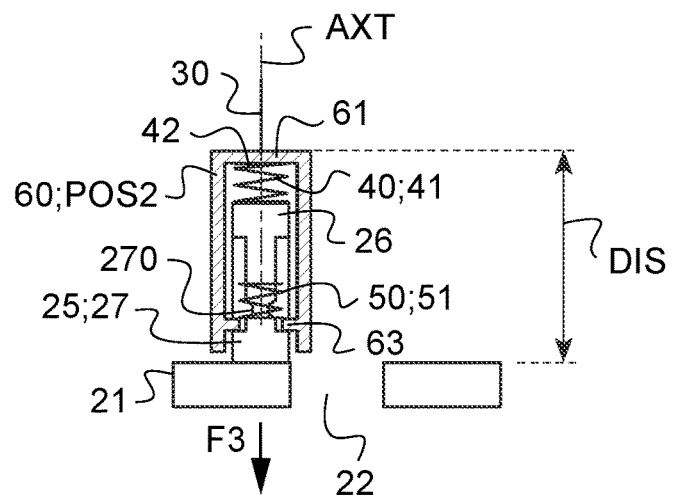
FIG. 6 is a diagram showing the immobilization system of the pivoting landing gear of FIG. 3 in an armed phase of the locked mode.

FIG. 3 shows a first version of a first alternative shown in more detail in FIGS. 4 to 6, but other embodiments can be seen in FIGS. 7 to 15.

Irrespective of the embodiment, the immobilization system 20 comprises a pin 25 that is able to move in relation to the pivoting assembly 12 and a control 30 configured to request the application of the locked mode or the unlocked mode. Each mode may comprise two phases that are explained below. For example, this control 30 may comprise at least one cable 33 that is able to move in translation, at least one bellcrank, etc. The term "cable" denotes an elongate link that is, for example, non-elastic and/or is advantageously housed in a protective sheath.

The immobilization system 20 further comprises a passage 22 provided in a base 21 that is secured to the pivoting assembly 12. For example, the base 21 forms a one-piece component with the cylinder 13 according to FIG. 3.

Therefore, the pin 25 is outside the passage 22 during an unlocked phase of the unlocked mode, so as to give the pivoting assembly 12 total freedom of movement in rotation about the pivot axis AXP.

Conversely, the pin 25 is arranged in the passage 22 during the locked phase of the locked mode shown in FIG. 3, so as to prevent the pivoting assembly 12 from rotating about the pivot axis AXP. The freedom of movement in rotation of the pivoting assembly about the pivot axis AXP is then restricted to an operating clearance. The pin 25 is then able to move slightly in the passage 22 in azimuth relative to the pivot axis AXP.

Furthermore, the immobilization system 20 has an elastic locking system 40, that is activated indirectly by the control 30 during the locked mode, to tend to push the pin 25 into the passage 22 in this locked mode. Starting from the unlocked mode, the method of the disclosure thus comprises activating the control 30 in order to switch to the locked mode, then, if the pin 25 is in line with the passage 22, moving the pin 25 into the passage 22 to reach the locked phase. If the pin 25 is not in line with the passage 22, the elastic locking system 40 presses the pin 25 against the base 21 during an armed phase, then moves the pin 25 into the passage 22 as soon as the pin 25 comes into line with the passage 22.

Moreover, the immobilization system 20 comprises an elastic unlocking system 50 that is activated indirectly by the control 30 during the unlocked mode, in order to make the pin 25 exit the passage 22 and thus release the pivoting assembly 12. The elastic unlocking system 50 is configured to allow the pin 25 to be extracted from the passage 22 only when there is a shearing force less than a threshold between the base 21 and the pin 25. Starting from the locked mode, the method of the disclosure thus comprises activating the control 30 in order to switch to the unlocked mode, then, if the pin 25 is in the passage 22 and in contact with the base 21, compressing an elastic unlocking system 50 during a disarmed phase. The pin 25 is kept in the passage 22 as long as this pin 25 is subject to a shearing force greater than or equal to a threshold. However, as soon as the pin 25 is subject to a shearing force less than the threshold, the elastic unlocking system 50 expands and ejects the pin 25 out of the passage 22 in order to switch to an unlocked phase.

According to the first alternative of FIGS. 3 to 10, the pin 25 is able to move in translation in relation to the base 21 along a translation axis AXT, for example parallel to the pivot axis AXP. The passage 22 can then be a bore in the base 21.

The immobilization system 20 therefore comprises a hollow support 60. This support 60 comprises a tubular guide that extends towards the base 21, along the translation axis AXT, from an end wall 61 of this support 60 to an open end 62 of this support 60. As a result, the open end 62 is located, along the translation axis AXT, between the end wall 61 and the base 21.

The pin 25 then extends partially into the support 60, at least during the locked phase. Irrespective of the variant of the first alternative, the pin 25 comprises a head 26 that slides in the support 60, being guided by the tubular guide. Moreover, the pin 25 comprises a locking rod 27 secured to the head, and therefore connected to the head. This locking rod 27 emerges through the open end 62 of the support 60, at least during the locked phase, so as to be able to enter the passage 22 in the base 21. For safety, the locking rod 27 may comprise a weak-link region 270. The locking rod 27 may also be guided by a guide secured to the base.

In these conditions, the elastic locking system 40 is arranged between the end wall 61 and the head 26. The elastic locking system 40 may possibly be fastened to the end wall 61. For example, the elastic locking system 40 may comprise an elastic block or a locking spring 41 having a coil 42 fastened to the end wall 61 in a conventional manner.

According to the first variant of the first alternative of FIG. 3, the support 60 is able to move in translation in relation to the base 21 along the translation axis AXT. For example, the support 60 slides in a guide secured to the stand 11.

The control 30 is connected to the support 60 in order to move this support from a first position POS1 requesting the application of the unlocked mode to a second position POS2 requesting the application of the locked mode. For example, the control 30 comprises a handle 31 or an equivalent, or indeed a linear actuator or the like, linked by a cable 33 to the support 60 and, for example, to the end wall 61. The cable 33 can slide in a rigid sheath 32.

Furthermore, the elastic unlocking system 50 is arranged between the head 26 and an inner shoulder 63 of the support 60. The inner shoulder 63 is situated between the head 26 and the base 21. The locking rod 27 passes through this inner shoulder 63 and the elastic unlocking system 50. For example, the elastic unlocking system 50 is fastened to the inner shoulder 63, or comprises an elastic block or an unlocking spring 51 having a coil 52 fastened to the inner shoulder 63.

FIGS. 3 to 6 illustrate the operation of the first variant of the first alternative.

In the locked phase of FIG. 3, the support 60 is pushed into the second position POS2 by the control 30. The pin 25 is arranged partially inside the passage 22. The elastic locking system 40 and the elastic unlocking system 50 are slightly compressed in order to hold the pin 25 in position, i.e., to prevent the pin 25 from moving in translation relative to the support 60 under the effect of vibrations, for example.

In reference to FIG. 4, a pilot can operate the control 30 in order to switch to the unlocked mode. The support 60 is moved to the first position POS1 by being moved away from the base 21 in the direction shown by the arrow F2. A distance DIS between the end wall 61 and the base 21 increases. The elastic locking system 40 is then at rest, being neither compressed nor extended. The elastic locking system 40 possibly no longer touches the pin 25, this elastic locking system 40 being carried by the end wall 61.

If the pivoting assembly 12 is slightly out of axial alignment, the base 21 bears against the pin 25, as shown in FIG. 4. The base 21 exerts a shearing force on the pin 25. If there is a shearing force greater than or equal to a threshold between the base 21 and the pin 25, the pin 25 does not move. The translational movement of the support 60 then compresses the elastic unlocking system 50. This elastic unlocking system 50 is calibrated so as not to cause the pin 25 to move in translation in these conditions. Indeed, the elastic unlocking system 50 is calibrated to allow the pin 25 to be extracted from the passage 22 only when there is a shearing force less than this threshold between the base 21 and the pin 25. The immobilization system 20 is then in an innovative disarmed phase. For example, the elastic unlocking system 50 is defined to prevent unlocking when the lateral thrust F1 is 20% greater than the thrust threshold enabling the pivoting assembly to pivot about the pivot axis AXP when this pivoting assembly is not pivotally locked.

In reference to FIG. 5, as soon as the shearing force between the base 21 and the pin 25 drops below the threshold, the elastic unlocking system 50 expands. With the support 60 rendered immobile by the control 30, the elastic unlocking system 50 exerts a force on the pin 25 to make it exit the passage 22. The immobilization system 20 is then in an unlocked phase.

Depending on the relative position of the pin 25 and the base 21 when the unlocked mode is activated, the immobilization system 20 can switch directly from the locked phase to the unlocked phase.

From this point, a pilot can operate the control 30 in order to switch to the locked mode. The support 60 is moved to the second position POS2 by being moved towards the base 21 in the direction shown by the arrow F3 in FIG. 6. The distance DIS between the end wall and the base 21 decreases.

If the pin 25 is aligned with the passage 22, the immobilization system 20 can switch to the locked phase of FIG. 3. If this is not the case, and in reference to FIG. 6, the pin 25 comes into contact with the base 21. The translational movement of the support 60 then compresses the elastic locking system 40. In contrast, the elastic unlocking system 50 is at rest, being neither compressed nor extended. The elastic unlocking system 50 possibly no longer touches the pin 25, this elastic unlocking system 50 being retained by the inner shoulder 63. The immobilization system 20 is then in an armed phase enabling it to automatically enter the locked phase when the pin 25 is in line with the passage 22.

FIGS. 7 to 10 show a second variant of the first alternative. In reference to FIG. 7, the support 60 is now stationary in relation to the stand 11, for example being secured to the stand 11.

In addition to the head 26 and the locking rod 27 referred to above, the pin 25 comprises an entry rod 28 that is also secured to the head 26, i.e., connected to the head. The locking rod 27 and the entry rod 28 are situated to either side of the head 26 along the translation axis AXT. The entry rod 28 also passes through the end wall 61 so as to extend partially out of the support 60.

The entry rod 28 therefore cooperates with the control 30 and the elastic unlocking system 50. This entry rod 28 may comprise a top 29 carrying a tube 70. The control 30 may comprise a cable 33 that passes through a wall of the tube to reach a plate 71 that is guided in translation in the tube 70. The cable 33 may be linked to a handle, or to an output shaft 35 of an actuator 34 controlled by a human-machine interface, for example.

The elastic unlocking system 50 may be arranged between said wall 72 and the plate 71. The elastic unlocking system 50 may comprise a spring or an equivalent, such as an elastic block, for example, made from elastomer, for example. The stiffness of the elastic unlocking system 50 along the translation axis AXT may be greater than the stiffness of the elastic locking system 40 along the translation axis.

Figure 7:
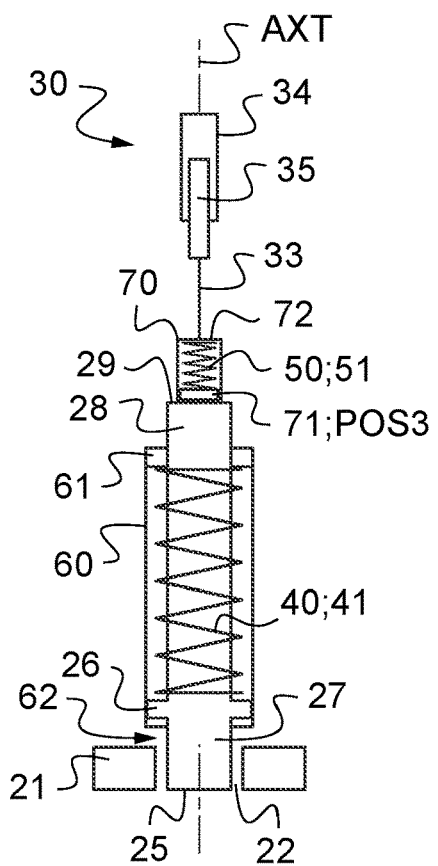
FIG. 7 is a diagram showing an immobilization system in a locked phase of the locked mode.

In the locked phase of FIG. 7, the cable 33 is moved towards the base 21 or released. The plate 71 is then arranged as close as possible to the base 21 in a locked position POS3. The elastic locking system 40 and the elastic unlocking system 50 are possibly slightly compressed in order to hold the pin 25, i.e., to prevent the pin 25 from moving unduly under the effect of vibrations, for example.

Figure 8:
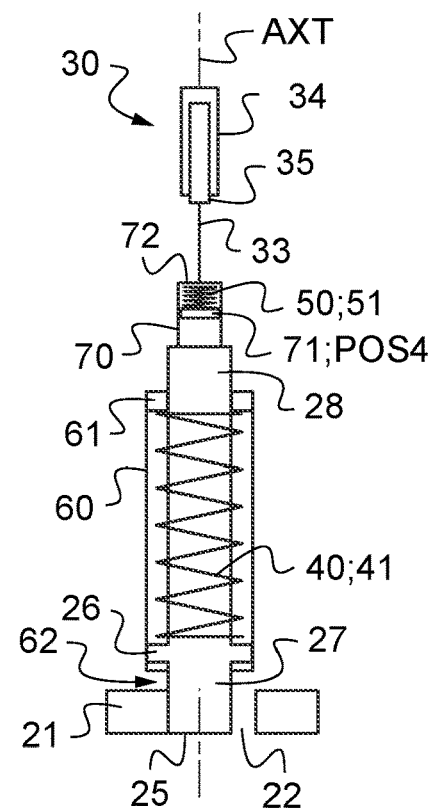
FIG. 8 is a diagram showing the immobilization system of FIG. 7 in a disarmed phase of the unlocked mode.

In reference to FIG. 8, a pilot can operate the control 30 in order to switch to the unlocked mode. The plate 71 moves upwards to the unlocked position POS4. If the pivoting assembly 12 is slightly out of axial alignment, the base 21 bears against the pin 25. The base 21 exerts a shearing force on the pin 25. If there is a shearing force greater than or equal to a threshold between the base 21 and the pin 25, the pin 25 does not move. The translational movement of the plate 71 then compresses the elastic unlocking system 50. The immobilization system 20 is then in an innovative disarmed phase.

Figure 9:
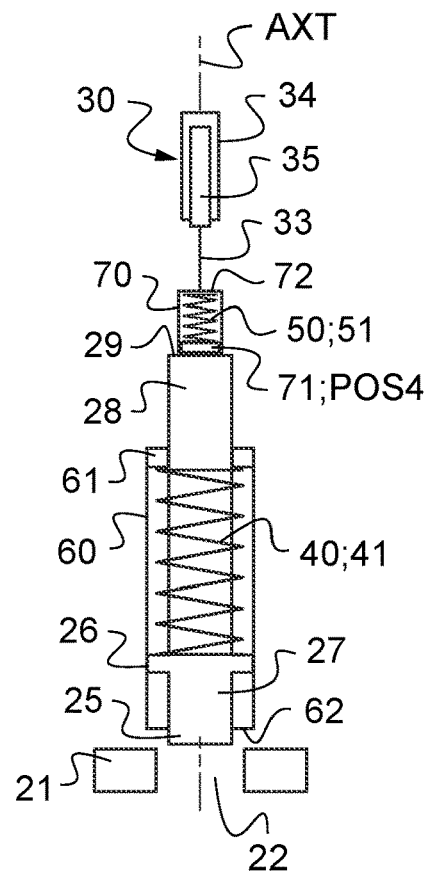
FIG. 9 is a diagram showing the immobilization system of FIG. 7 in an unlocked phase of the unlocked mode.
Figure 10:
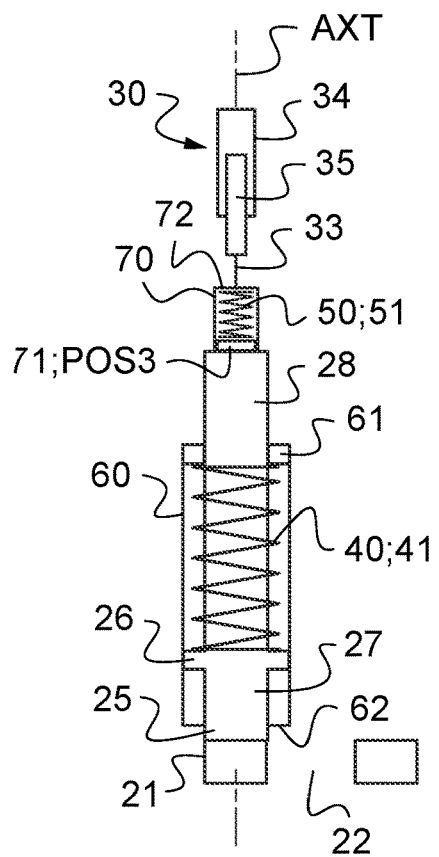
FIG. 10 is a diagram showing the immobilization system of FIG. 7 in an armed phase of the locked mode.

In reference to FIG. 9, as soon as the shearing force between the base 21 and the pin 25 drops below the threshold, the elastic unlocking system 50 expands and exerts a force on the pin 25 to make it exit the passage 22. The immobilization system 20 is then in an unlocked phase.

Depending on the relative position of the pin 25 and the base 21 when the unlocked mode is activated, the immobilization system 20 can switch directly from the locked phase to the unlocked phase.

From this point, a pilot can operate the control 30 in order to switch to the locked mode. The plate 71 is moved to the position locked POS3 by being moved towards the base 21.

If the pin 25 is aligned with the passage 22, the immobilization system 20 can switch to the locked phase of FIG. 7. If this is not the case, and in reference to FIG. 10, the pin 25 comes into contact with the base 21. The translational movement of the pin 25 relative to the support 60 then compresses the elastic locking system 40. In contrast, the elastic unlocking system 50 is at rest, being neither compressed nor extended, the cable 33 possibly being able to be braced. The immobilization system 20 is then in the armed phase.

FIGS. 11 to 15 show a second alternative comprising a pin 25 that is able to rotate in relation to the base, in particular. In reference to FIG. 12, the pin 25 can enter the passage 22 formed by a radial notch in the base 21.

Figure 11:
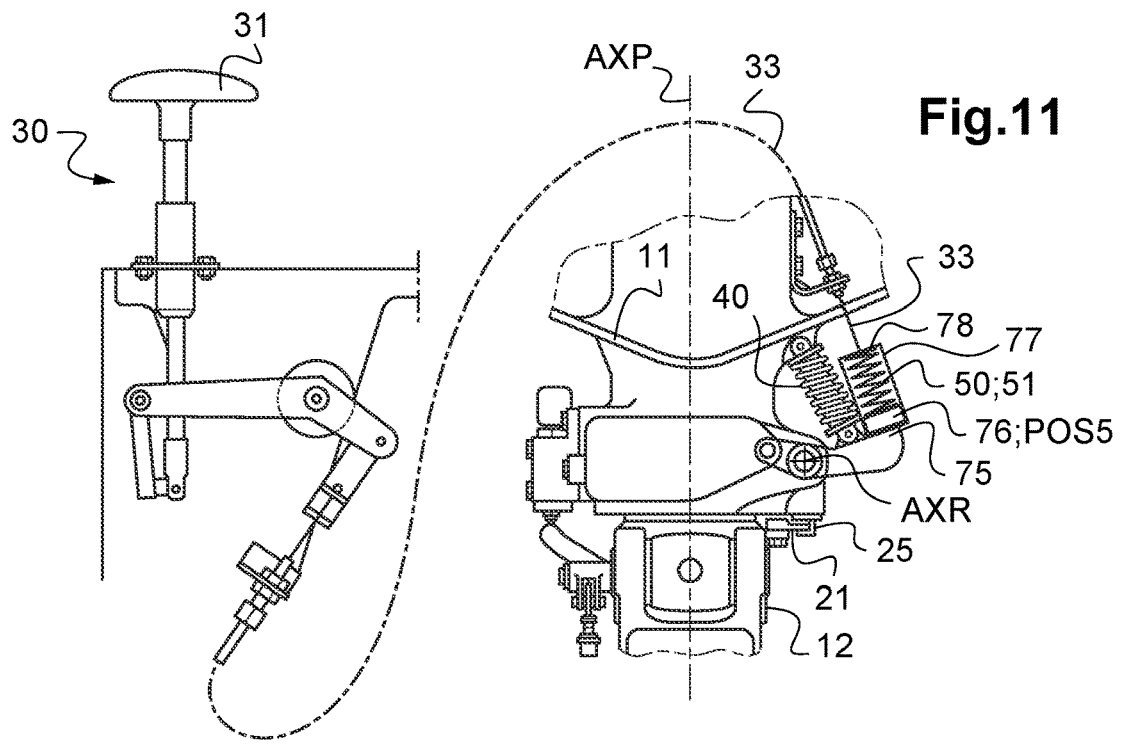
FIG. 11 is a diagram showing an immobilization system in a locked phase of the locked mode.
Figure 12:
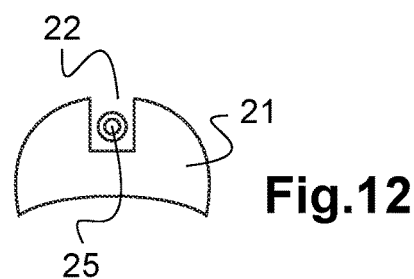
FIG. 12 is a diagram showing the base of the immobilization system of FIG. 11.

According to FIG. 11, the pin 25 is carried by a lever 75 pivotally connected to the stand 11. The elastic locking system 40 is then arranged between the stand 11 and the lever 75.

Moreover, the control 30 comprises a cable 33 connected to a panel 76 that is able to move in translation in a guide 77. The elastic unlocking system 50 is arranged between the panel 76 and a partition 78 of the guide 77 through which the cable 33 passes. The cable 33 may be linked to a handle as in the example shown, or to an actuator, for example, possibly via one or more bellcranks.

The guide 77 is then secured to the lever 75.

In the locked phase of FIG. 11, the cable 33 is pulled by the lever 75 or released. The panel 76 is then arranged as close as possible to the lever 75 in a locked position POS5. The elastic locking system 40 and the elastic unlocking system 50 are possibly slightly compressed. The lever 75 pivots to position the pin 25 in the passage 22.

Figure 13:
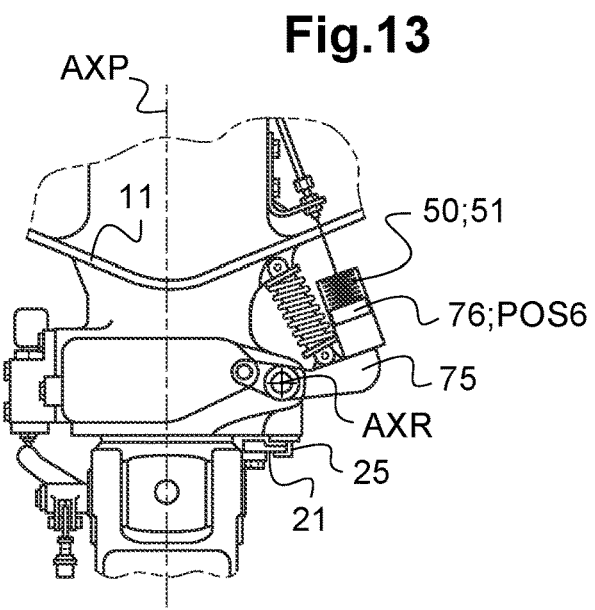
FIG. 13 is a diagram showing the immobilization system of FIG. 11 in a disarmed phase of the unlocked mode.

In reference to FIG. 13, a pilot can operate the control 30 in order to switch to the unlocked mode. The panel 76 is moved to the unlocked position POS6. If the pivoting assembly 12 is slightly out of axial alignment, the base 21 bears against the pin 25. The translational movement of the panel 76 then compresses the elastic unlocking system 50. The immobilization system 20 is then in an innovative disarmed phase.

Figure 14:
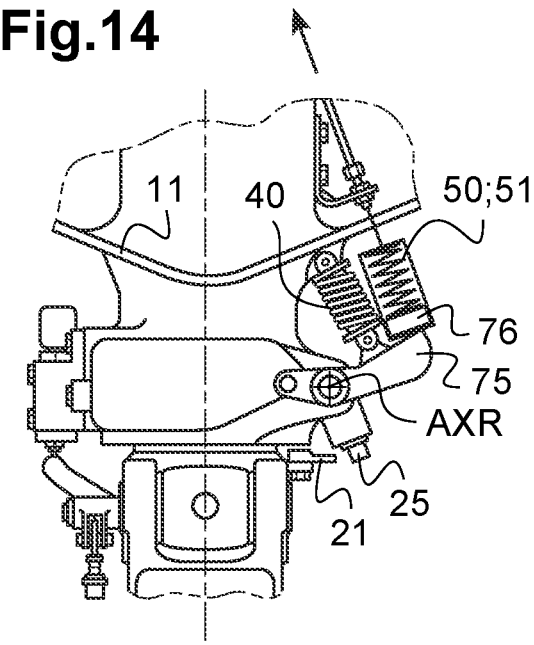
FIG. 14 is a diagram showing the immobilization system of FIG. 11 in an unlocked phase of the unlocked mode.
Figure 15:
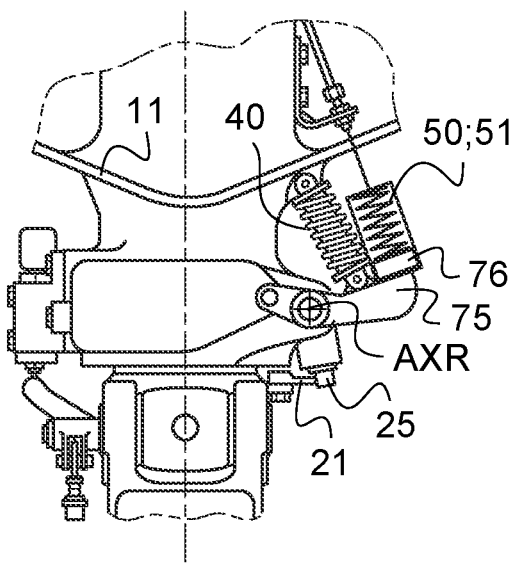
FIG. 15 is a diagram showing the immobilization system of FIG. 11 in an armed phase of the locked mode.

In reference to FIG. 14, as soon as the shearing force between the base 21 and the pin 25 drops below the threshold, the elastic unlocking system 50 expands and exerts a force on the guide 77 that pivots the lever 75, making the pin 25 exit the passage 22. The immobilization system 20 is then in an unlocked phase.

From this point, a pilot can operate the control 30 in order to switch to the locked mode. The panel 76 is controlled to be moved once more to the position locked POS5. If the pin 25 is aligned with the passage 22, the immobilization system 20 can switch to the locked phase of FIG. 11. If this is not the case, the pin 25 comes into contact with the base 21. The lever 75 then compresses the elastic locking system 40. The immobilization system 20 is then in the armed phase shown in FIG. 15.

Naturally, the present disclosure is subject to numerous variations as regards its implementation. Although several embodiments are described above, it should readily be understood that it is not conceivable to identify exhaustively all the possible embodiments. It is naturally possible to replace a described means with equivalent means without going beyond the ambit of the present disclosure.

What is claimed is:

1. A landing gear, the landing gear comprising:
   a stand and a pivoting assembly, the pivoting assembly carrying a contact member configured to be in contact with the ground, the pivoting assembly being able to rotate about a pivot axis in relation to the stand, the landing gear having an immobilization system, the immobilization system comprising:
   a movable pin and a control configured to request the application of a locked mode or an unlocked mode;
   a passage, the pin being outside the passage in an unlocked phase of the unlocked mode, the pin being able to move in the passage in azimuth relative to the pivot axis in a locked phase of the locked mode;
   an elastic locking system pushing the pin, when in the locked mode, either against a base during an armed phase of the locked mode as long as the pin does not enter the passage, or into the passage as soon as the pin is in line with the passage in the locked phase;
   an elastic unlocking system configured to move the pin out of the passage when activation of the unlocked mode is commanded by the control, wherein the passage is provided in the base secured to the pivoting assembly, the elastic unlocking system being calibrated to allow the pin to be extracted from the passage only when there is a shearing force between the base and the pin less than a threshold.

2. The landing gear according to claim 1, wherein the pin is carried by a lever pivotally connected to the stand, the elastic locking system being arranged between the stand and the lever, the control comprising a cable connected to a panel that is able to move in translation in a guide, the guide being connected to the lever, the elastic unlocking system being arranged between the panel and a partition of the guide through which the cable passes.

3. The landing gear according to claim 1, wherein the contact member comprises a wheel that is able to rotate about a wheel axis in relation to the pivoting assembly, the wheel axis being distinct from the pivot axis.

4. The landing gear according to claim 1, wherein the pin is able to move in translation in relation to the base along a translation axis.

5. The landing gear according to claim 4,
wherein a stiffness of the elastic unlocking system along the translation axis is greater than a stiffness of the elastic locking system along the translation axis.

6. The landing gear according to claim 4,
wherein the support is stationary in relation to the stand, the pin comprising an entry rod secured to the head and passing through the end wall of the support.

7. The landing gear according to claim 6,
wherein the entry rod extends from the head to a top secured to a hollow tube, the control comprising a cable that extends up to a plate that is able to move in translation in the tube, passing through a wall of the tube, the elastic unlocking system being arranged between the wall and the plate.

8. The landing gear according to claim 4, wherein the immobilization system further comprises a hollow support that extends towards the base along the translation axis from an end wall to an open end, the open end being arranged between the end wall and the base, the pin comprising a head secured to a locking rod, the head being located in the hollow support and the locking rod emerging through the open end of the hollow support at least in the locked phase, the elastic locking system being arranged between the end wall and the head.

9. The landing gear according to claim 8,
wherein the elastic locking system comprises a locking spring with a coil fastened to the end wall.

10. The landing gear according to claim 8,
wherein the support is able to move in translation in relation to the stand, the control being connected to the support.

11. The landing gear according to claim 10,
wherein the elastic unlocking system is arranged between the head and an inner shoulder of the support, the locking rod passing through the inner shoulder, the inner shoulder being situated between the head and the base.

12. The landing gear according to claim 11,
wherein the elastic unlocking system comprises an unlocking spring with a coil fastened to the inner shoulder.

13. A rotorcraft,
wherein the rotorcraft comprises at least one pivoting landing gear according claim 1.

14. A method for locking and unlocking a landing gear, the landing gear comprising:
a stand and a pivoting assembly carrying a contact member configured to be in contact with the ground, the pivoting assembly being able to rotate about a pivot axis in relation to the stand, the landing gear having an immobilization system configured to immobilize the pivoting assembly within a predetermined range of positions in relation to the stand during a locked phase of a locked mode and to authorize unlimited pivoting of the pivoting assembly in relation to the stand during an unlocked phase of an unlocked mode, the immobilization system comprising:
a movable pin and a control configured to request the application of the locked mode or the unlocked mode;
a passage provided in a base secured to the pivoting assembly, the pin being outside the passage in the unlocked phase, the pin being able to move in the passage in azimuth relative to the pivot axis in the locked phase, the method comprising:
when the immobilization system is in the unlocked mode, activating the control in order to switch to the locked mode, then:
if the pin is in line with the passage, moving the pin into the passage; and
if the pin is not in line with the passage, pressing the pin against the base with an elastic locking system and moving the pin into the passage as soon as the pin comes into line with the passage; and
when the immobilization system is in the locked mode, activating the control in order to switch to the unlocked mode, then:
if the pin is in the passage and in contact with the base, compressing an elastic unlocking system; and
keeping the pin in the passage as long as the pin is subject to a shearing force greater than or equal to a threshold, the immobilization system being in a disarmed phase; and
as soon as the pin is subject to a shearing force less than the threshold, expanding the elastic unlocking system and ejecting the pin out of the passage under the effect of the expansion of the elastic unlocking system of the in order to switch to the unlocked phase.

15. A landing gear, the landing gear comprising:
a stand and a pivoting assembly, the pivoting assembly carrying a contact member configured to be in contact with the ground, the pivoting assembly rotatable about a pivot axis in relation to the stand, the landing gear having an immobilization system;
the immobilization system comprising:
a movable pin and a control configured to request the application of a locked mode or an unlocked mode;
a passage, the pin outside the passage in an unlocked phase of the unlocked mode, the pin moveable in the passage in azimuth relative to the pivot axis in a locked phase of the locked mode;
an elastic locking system capable of biasing the pin, when in the locked mode, either against a base during an armed phase of the locked mode as long as the pin does not enter the passage, or into the passage when the pin is in line with the passage in the locked phase;
an elastic unlocking system configured to move the pin out of the passage when the unlocked mode is activated by the control,
wherein the passage is provided in the base secured to the pivoting assembly, the elastic unlocking system allowing the pin to be extracted from the passage when there is a shearing force between the base and the pin less than a threshold.

16. The landing gear according to claim 15, wherein the pin is able to move in translation in relation to the base along a translation axis.

17. The landing gear according to claim 16, wherein the immobilization system comprises a hollow support that extends towards the base along the translation axis from an end wall to an open end, the open end being arranged between the end wall and the base, the pin comprising a head secured to a locking rod, the head being located in the hollow support and the locking rod emerging through the open end of the hollow support at least in the locked phase, the elastic locking system being arranged between the end wall and the head.

18. The landing gear according to claim 17, wherein the support is able to move in translation in relation to the stand, the control being connected to the support.

19. The landing gear according to claim 18, wherein the elastic unlocking system is arranged between the head and an inner shoulder of the support, the locking rod passing through the inner shoulder, the inner shoulder being situated between the head and the base, and wherein the elastic unlocking system comprises an unlocking spring with a coil fastened to the inner shoulder.

20. A rotorcraft:
wherein the rotorcraft comprises at least one pivoting landing gear according claim 15, and
wherein the contact member comprises a wheel that is able to rotate about a wheel axis in relation to the pivoting assembly, the wheel axis being distinct from the pivot axis.

* * * * *